United States Patent

Malow et al.

[11] Patent Number: 5,261,521
[45] Date of Patent: Nov. 16, 1993

[54] APPARATUS FOR TURNING SMALL GOODS, PARTICULARLY PACKAGES, ON A CONVEYOR BELT

[75] Inventors: Siegmar Malow, Konstanz; Rainer Vogel, VS-Schwenningen, both of Fed. Rep. of Germany

[73] Assignee: Licentia Patent-Verwaltungs GmbH, Frankfurt, Fed. Rep. of Germany

[21] Appl. No.: 838,295
[22] PCT Filed: Jun. 26, 1991
[86] PCT No.: PCT/EP91/01196
 § 371 Date: Mar. 10, 1992
 § 102(e) Date: Mar. 10, 1992
[87] PCT Pub. No.: WO92/00905
 PCT Pub. Date: Jan. 23, 1992

[30] Foreign Application Priority Data
 Jul. 12, 1990 [DE] Fed. Rep. of Germany ....... 4022160

[51] Int. Cl.⁵ .............................................. B65G 47/24
[52] U.S. Cl. ...................................... 198/409; 198/413
[58] Field of Search ......................... 198/409, 412, 413

[56] References Cited

U.S. PATENT DOCUMENTS

| | | | |
|---|---|---|---|
| 3,013,648 | 12/1961 | Kovach | 198/412 X |
| 3,212,619 | 10/1965 | Mödder | 198/412 |
| 3,552,581 | 1/1971 | Gagnon | 198/412 X |
| 3,666,073 | 5/1972 | Lings et al. | 198/412 |
| 3,753,505 | 8/1973 | Ouska | 198/412 X |
| 3,763,990 | 10/1973 | Ouska | 198/412 |
| 3,831,782 | 8/1974 | Werntz | 198/412 X |
| 3,927,819 | 12/1975 | Lang et al. | 198/412 X |
| 4,022,332 | 5/1977 | Freakes et al. | 198/413 X |
| 4,067,451 | 1/1978 | Winters | 198/413 X |
| 4,411,350 | 10/1983 | Wolfram | |

FOREIGN PATENT DOCUMENTS

| | | |
|---|---|---|
| 3214457 | 10/1983 | Fed. Rep. of Germany . |
| 1489070 | 7/1967 | France . |
| 57-131620 | 8/1982 | Japan . |

*Primary Examiner*—D. Glenn Dayoan
*Attorney, Agent, or Firm*—Spencer, Frank & Schneider

[57] ABSTRACT

The invention relates to an apparatus for turning small goods, particularly packages, on a conveyor belt and resides in that the apparatus is composed of mutually perpendicular transporting surfaces which form an independent part of the conveyor belt and are pivotal by way of a pivot drive partially or entirely about 90° in such a manner that, after a 90° pivoting process, the transporting surface which was flush in the conveyor belt direction on transporting surface is flush with the conveyor belt surface and the surface that was flush in the direction of the conveyor belt before the pivoting process is perpendicular to the conveyor belt surface.

3 Claims, 1 Drawing Sheet

U.S. Patent    Nov. 16, 1993    5,261,521
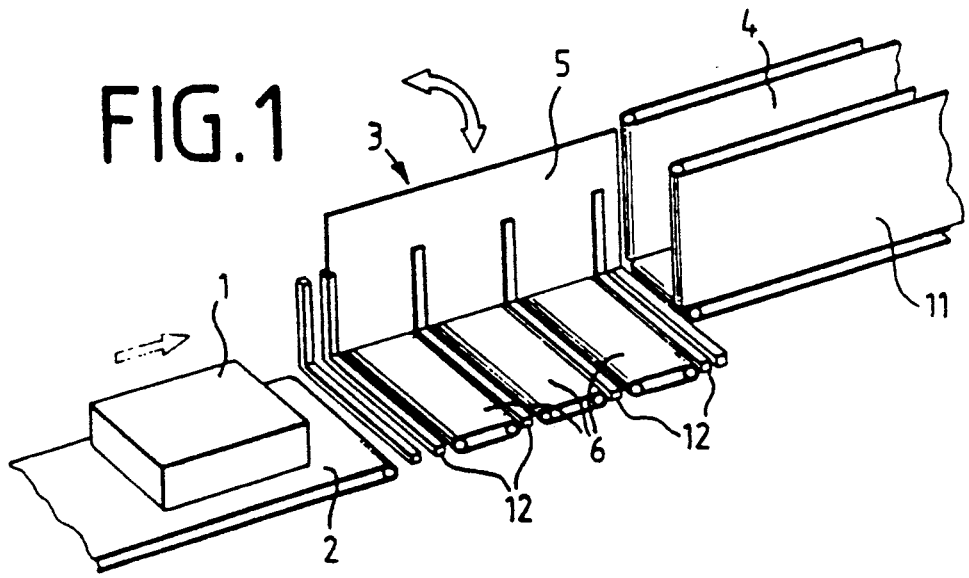
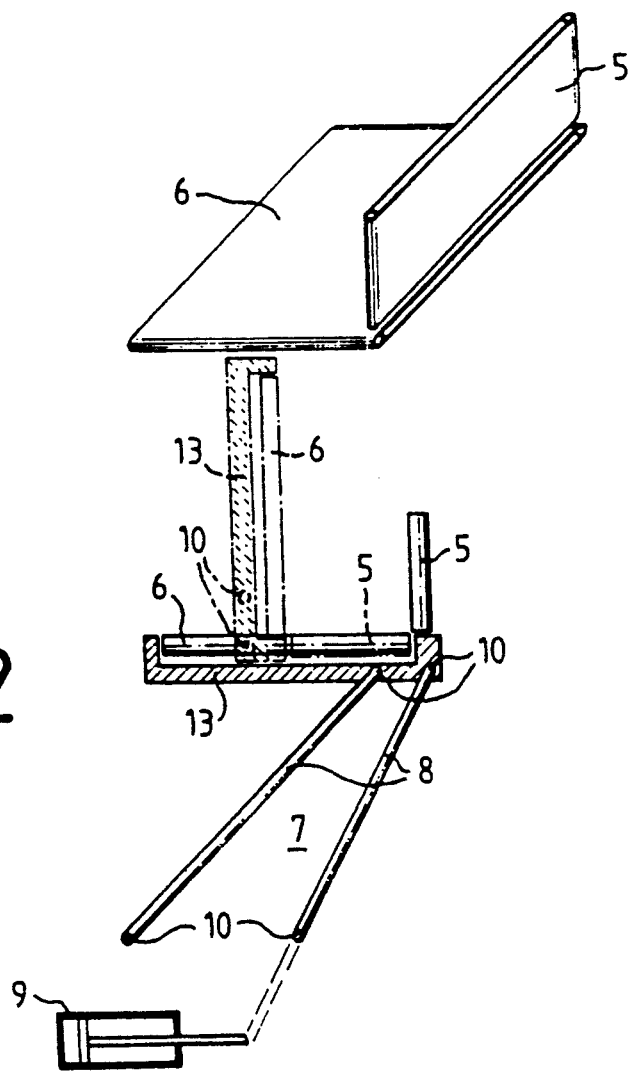

APPARATUS FOR TURNING SMALL GOODS, PARTICULARLY PACKAGES, ON A CONVEYOR BELT

BACKGROUND OF THE INVENTION

The invention relates to an apparatus for turning small goods, particularly packages, on a conveyor belt.

Turning devices are known in which the small goods are stood up by means of a sloped roller track or the goods are turned by tipping them over.

Such devices have the drawback that they do not permit the goods to be in a defined position on the conveyor belt.

SUMMARY OF THE INVENTION

It is an object of the invention to provide an apparatus for turning small goods in which the goods are pivotal about at least 90° into any desired position. Moreover, the apparatus is to be configured so that the goods are transported away flush with the preceding and the subsequent conveyor belt.

One embodiment of the invention will now be described with reference to the attached drawing.

FIG. 1 is a perspective view of an apparatus according to the invention for turning small goods;

FIG. 2, shows the configuration of a pivot drive provided with articulated rods for the apparatus according to the invention.

DESCRIPTION OF THE PREFERRED EMBODIMENT

The small goods, a package, is marked 1 and lies on a conveyor belt 2. Conveyor belt 2 transports the package in the direction of the arrow toward a turning device 3. After the package has been pivoted on turning device 3, it moves upright into conveyor path 4 and is transported away in the direction of the arrow.

The device for turning the small goods 1 is composed of a lateral guide member 5 and conveyor belts 6 extending in the direction of conveyor belt 2. As shown in FIG. 2, conveyor belts 6 may also be made of one piece. Likewise, the lateral guide member 5 may be configured as a driven conveyor belt (FIG. 2).

The above object generally is achieved according to a first embodiment of the present invention by an apparatus for turning small goods, particularly packages, on a conveyor, wherein the apparatus is composed of first and second conveyor belts having respective transporting surfaces that are perpendicular to one another and form an independent component of the conveyor, with the first and second conveyor belts being arranged on a frame which is pivotal about 90° by a pivot drive so that the transporting surface of the one of the first and second conveyor belts that is flush in the direction of the conveyor on the other transporting surface, once pivoted about 90°, is flush with the conveyor surface, and the transporting surface that was flush in the direction of the conveyor and with the conveyor surface before the pivoting process is perpendicular to the conveyor surface.

The above object is achieved according to a second embodiment of the invention by an apparatus for turning small goods, particularly packages, on a conveyor, which apparatus comprises: a horizontal transporting surface flush with a surface of the conveyor and extending in the direction of the conveyor and a guide surface extending in the direction of the conveyor and perpendicular to the transporting surface, with the transporting surface and the guide surface forming an independent component of the conveyor, the transporting surface is subdivided into partial conveyor belts and has rectangular rods arranged between the partial conveyor belts and connected with one another by way of a frame, and a pivot drive having articulated rods which engage the frame in such a manner that the rectangular rods are pivotal about 90° within spaces in the guide surface and between the partial conveyor belts.

Actuation of the device for turning the package is effected by means of a pivot drive 7 composed of articulated rods 8 and a pneumatic cylinder 9.

Conveyor belts 5 and 6 run in synchronism and are perpendicular to one another. The points of articulation 10 of the articulated rods can be selected at will; they must be adapted to one another in such a way that it is possible to perform a pivoting movement about a maximum angle of 90°. According to the invention, the pivoting must here occur in such a manner that transporting surfaces 5 and 6 which are perpendicular to one another are pivoted so that, after pivoting, transporting surface 5, which was perpendicular to the conveying direction, is flush with transporting surface 2 and transporting surface 6, which before the pivoting process was flush in the direction of transporting surface 2, is perpendicular to transporting surface 5 in such a way that it forms a line with the lateral faces 11 of transporting path 4.

Conveyor belts 5 and 6 may be disposed on a frame 12 which is pivoted by the articulated rods 8 (FIG. 2). All of the conveyor belts are then pivoted about 90°.

It is also possible, as shown in FIG. 1, to arrange a rake structure of individual rectangular rods 12 between partial conveyor belts 6 and guide surface 5. These articulated rods are connected by means of a frame at which they engage. In this embodiment, the small goods 1 are lifted by the rods 12 of the rake and are pivoted about 90°. The rods 12 of the rake then move only in the recesses between partial conveyor belts 6 and in guide surface 5.

In both embodiments, transporting surfaces 5, 6 or the rectangular rods 12 are pivoted about 90° during the pivoting process in such a way that the transporting surface 5, which is flush on transporting surface 6 extending in conveyor belt direction 2, after being pivoted about 90° is flush with conveyor belt surface 2, and surface 6 which was flush in the direction of conveyor belt 2 before the pivoting process is perpendicular to conveyor belt surface 2.

We claim:

1. An apparatus for turning small goods, particularly packages, on a conveyor, said apparatus comprising: a horizontal transporting surface flush with a surface of the conveyor and extending in the direction of the conveyor and a guide surface extending in the direction of the conveyor and perpendicular to said transporting surface, said transporting surface and said guide surface forming an independent component of the conveyor, said transporting surface being subdivided into partial conveyor belts and having rectangular rods arranged between the partial conveyor belts and connected with one another by way of a frame, and a pivot drive having articulated rods which engage said frame in such a manner that said rectangular rods are pivotal about 90° within spaces in the guide surface and between the partial conveyor belts.

2. An apparatus according to claim 1, characterized in that the pivot drive is composed of articulated rods which are actuated by a pneumatic cylinder.

3. A turning arrangement according to claim 1 wherein said rectangular rods have portions arranged between said partial conveyor belts and portions flush with said guide surface and wherein said portions flush with said guide surface are disposed between said partial conveyor belts after pivoting by 90°.

* * * * *